Feb. 16, 1954 W. I. MILLER 2,669,085
PLOW-TYPE WINDROW TURNER
Filed Jan. 22, 1951 2 Sheets-Sheet 1

Walter I. Miller
INVENTOR.

BY *Clarence A. O'Brien*
*and Harvey B. Jackson*
Attorneys

Feb. 16, 1954 W. I. MILLER 2,669,085
PLOW-TYPE WINDROW TURNER
Filed Jan. 22, 1951 2 Sheets-Sheet 2

Walter I. Miller
INVENTOR.

BY *Clarence A.O'Brien*
*and Harvey B. Jacobson*
Attorneys

Patented Feb. 16, 1954

2,669,085

UNITED STATES PATENT OFFICE 2,669,085

PLOW-TYPE WINDROW TURNER

Walter I. Miller, Farmdale, Ohio, assignor of one-fourth to Forest H. Miller and one-fourth to Reuben L. Miller, both of Farmdale, Ohio Application January 22, 1951, Serial No. 207,117

8 Claims. (Cl. 56—370)

1

This invention relates to new and useful improvements in windrowing devices and the primary object of the present invention is to provide a plow-type windrow turner attachment for tractors that will direct plants sidewardly of the tractor and away from the rear wheels of the tractor to prevent the plants from being rolled upon by the rear tractor wheels.

Another important object of the present invention is to provide a plow-type windrow turner including a horizontally rockable plow beam supporting frame and novel and improved means for retaining the frame in a selected rotated position to vary the ground engaging position of plow beams carried by the frame.

Yet another object of the present invention is to provide a plow-type windrow turner involving an adjustable stop means that will limit rocking of the frame or adjustment of the frame in order to prevent the forward ends of the plow beams from digging into the ground.

A further object of the present invention is to provide a device of the aforementioned character wherein the plow beams are independently pivoted to the frame for vertical swinging movement and a spring acting on each beam and yieldingly urging the forward ends of the beams toward the ground.

A still further aim of the present invention is to provide a plow-type windrow turner wherein the forward ends of the beams support upwardly and rearwardly curved and sidewardly curved guide bars that will direct plants away from the rear wheel of a tractor in front of which the beams are disposed.

Other objects and advantages reside in the details of construction and operation as more fully hereinafter described and claimed, reference being had to the accompanying drawings forming part hereof, wherein like numerals refer to like parts throughout, and in which:

Figure 1:
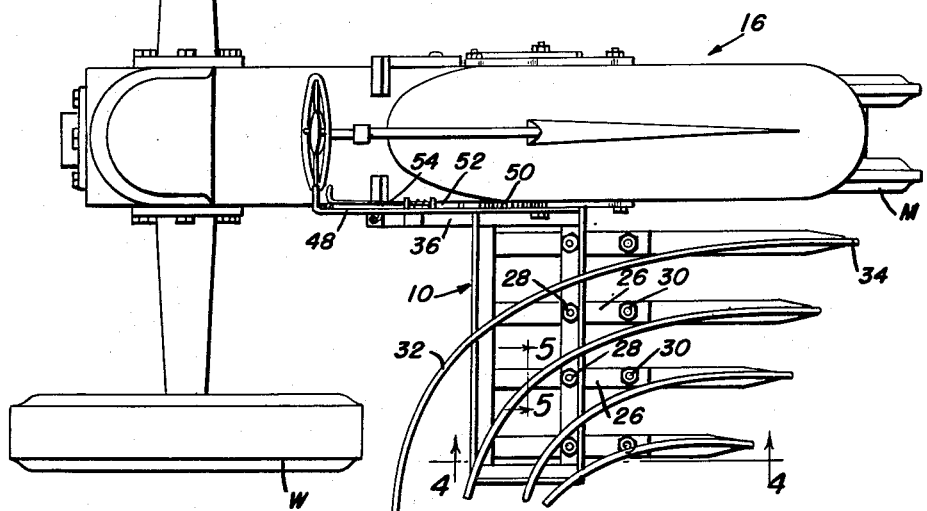
Figure 1 is a plan view of a tractor and showing the present invention mounted thereon.
Figure 4:
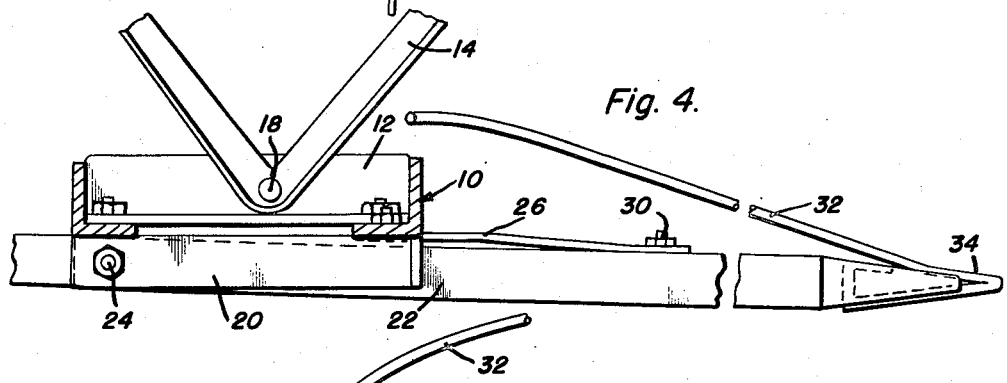
Figure 4 is an enlarged detail vertical sectional view taken substantially on the plane of section line 4—4 of Figure 1.
Figure 5:
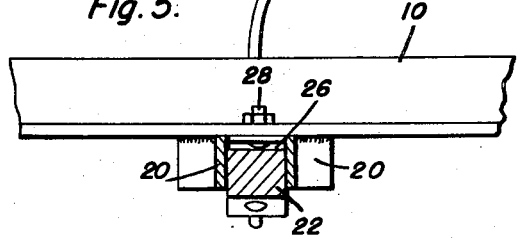
Figure 5 is an enlarged detail vertical section view taken substantially on the plane of section line 5—5 of Figure 1.

Referring now to the drawings in detail, wherein for the purpose of illustration, there is disclosed a preferred embodiment of the present invention, the numeral 10 represents an elongated,

2 open, preferably rectangular frame of angle iron construction that includes a transverse angle iron bar 12.

A pair of substantially V-shaped side members 14 are secured to the sides of a tractor 16 between the forward and rear ends of the tractor and their lower ends are pivoted to the frame by horizontal pivots 18. One of the members 14 is pivoted at its lower end to one end of the frame 10 whereas the other of the members 14 is pivoted to the vertical flange of bar 12 to permit horizontal rocking or swinging movement of the frame 10 about the pivots 18.

One end of the frame 10 projecting outwardly from one side of the tractor, between the forward and rear wheels of the tractor, and supports pairs of spaced parallel guide angles 20 that are disposed transversely of the frame and longitudinally of the tractor.

The rear ends of a plurality of spaced parallel plow beams 22 are received between the guides 20 and are pivoted to the guides by horizontal pivots 24. Springs 26 are terminally secured to the frame 10 and the beams 22 by fasteners 28 and 30 to yieldingly urge the forward tapered ends of the beams downwardly.

Each of the plow beams 22 supports a resilient guide rod or bar 32. The forward tapered ends 34 of the rods 32 are suitably anchored to the forward tapered ends of the plow beams and the rods 32 are curved upwardly and rearwardly from the forward ends of the beams and also curve sidewardly from the tractor.

Figure 2:
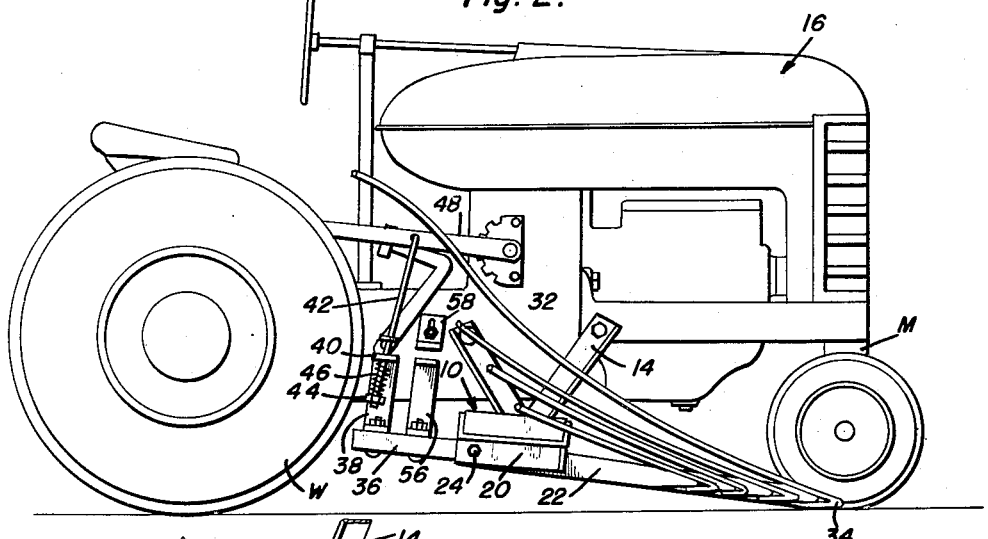
Figure 2 is a side view of Figure 1.
Figure 3:
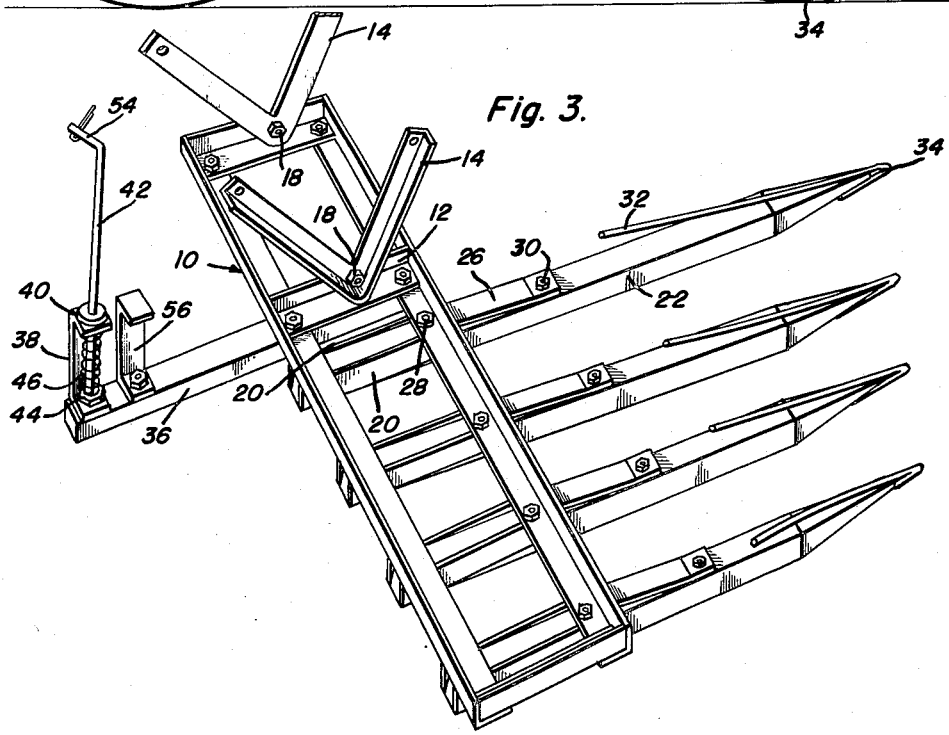
Figure 3 is a perspective view of the invention removed from the tractor and the lift means and with the guide bars broken away.

The rods 32 are progressively reduced in length from the innermost rod to the outermost rod and the inclination of the rods vary, progressively, from the innermost rod to the outermost rod, as shown in Figures 1 and 2. The rear ends of the rods extend past the outer end of the frame 10 (see Figure 1) so that plants will be directed away from the rear wheel W of the tractor in front of which the beams are located.

An arm 36 projects laterally and rearwardly from the frame 10 alongside of the tractor 16 and supports the lower flange of a channel bracket 38 whose upper flange 40 slidably supports a bar or rod 42. The lower end of the rod 40 supports a nut 44 and a coil spring 46 that is biased between the nut 44 and the flange 40.

A vertically swingable lever 48 is pivoted at its forward end to a toothed plate 50 that is fixed to one side of the tractor. The lever 48 carries a slidable spring urged dog 52 that will engage between selected teeth of the plate 50 to retain the lever 48 in a predetermined vertically inclined position. The upper laterally projecting end 54 of the rod 42 is pivoted to the lever 48 so that the frame 10 may be adjusted about its pivots 18 for raising or lowering the forward ends of the beams 22.

Means is provided for limiting adjustment of the frame 10 about its pivots 18 and for also limiting downward movement of the forward ends of the beams 22. This means consists of a stop arm 56 that underlies a vertically adjustable stop or abutment 58 mounted on the side of the tractor. As the arm 36 is raised, the arm 56 will engage the abutment 58 and thereby limit the adjustment of the frame 10 about its pivots 18.

It is noted that the beams 22 are progressively reduced in their lengths from the innermost beam to the outermost beam as shown in Figure 1 and that the forward end of the innermost beam is disposed alongside of the front wheel mount M of the tractor.

In practical use of the present invention, the lever 48 is manually actuated to rock the frame 10 and lower the forward ends of the beams 22. As the tractor moves forwardly, the forward ends of the beams will engage and lift the plants and the rods 32 will guide the plants away from the rear wheel W of the tractor to prevent harm to the plants.

The device thus described is particularly adapted for turning clover bottom side up with very little damage to the clover; however, the same is also suitable for raking and turning other plants.

Having described the invention, what is claimed as new is:

1. In a tractor including a vertically swingable and adjustable lift lever, a plow-type windrow turner comprising an elongated frame pivoted at one end to the tractor and having its other end projecting outwardly from one side of the tractor, a plurality of spaced parallel beams carried by the frame and disposed longitudinally of and at one side of the tractor, said beams being individually pivoted to the frame for vertical swinging movement, means carried by the beams for guiding plants lifted by the beams to one side of the tractor and away from the rear wheels of the tractor, means connecting the frame to the lift lever for selectively raising and lowering the forward ends of the beams as a unit, and a spring for each beam urging the forward ends of the beams against the ground.

2. The combination of claim 1 and means limiting swinging movement of the frame and also limiting the downward lowering of the forward ends of the beam.

3. The combination of claim 2 wherein said means includes a stop arm movable with the frame, and an abutment mounted on the tractor above the arm for engaging the arm during predetermined swinging of the frame by said lever.

4. The combination of claim 2 wherein said means connecting the frame to the lever includes a channel bracket attached to the frame, a rod pivoted to the lever and slidably carried by the bracket, and a spring surrounding the rod and biased between the rod and the bracket to resiliently support the frame.

5. The combination of claim 1 wherein said guide means includes an arcuate bar extending upwardly and rearwardly from the forward ends of the beams and said bar also extending sidewardly from the tractor.

6. In a tractor, a plow-type windrow turner comprising an elongated frame, a pair of side members mounted on the sides of the tractor, horizontal pivots securing the side members to one end of the frame and supporting the frame transversely of the tractor with one end of the frame projecting outwardly from one side of the tractor, a plurality of spaced parallel plow beams disposed longitudinally of the tractor and pivoted at their rear ends to the outwardly projecting end of the frame for vertical swinging movement, a plurality of springs attached to the frame and engaging the beams to yieldingly urge the forward ends of the beams downwardly, an arcuate bar attached to the forward end of each beam and extending rearwardly, upwardly and sidewardly from the forward ends of the beams, a vertically swingable and adjustable lever attached to the tractor, an arm projecting laterally and rearwardly from the frame, a spring suspended rod slidably secured to the arm and pivoted to the lever to permit rocking of the frame about the horizontal pivots and stop means associated with the arm for limiting rocking of the frame about its pivots.

7. A plow-type windrow turner comprising an elongated frame having tractor mounting means at one end portion, a plurality of spaced parallel beams having rear ends pivoted to the frame for vertical swinging movement of the beams, said beams including an outer beam, an inner beam and a pair of intermediate beams, said beams being progressively increased in length from the outer beam to the inner beam, spring means acting on the beams and urging the forward ends of the beams to their ground contacting position, a plurality of arcuate rods having forward ends fixed to the forward ends of the beams, said rods extending upwardly and rearwardly from the forward ends of the beams and curving past and over the outer beam, said rods being progressively reduced in length from the inner beam to the outer beam and arranged with the rear ends of the rods carried by the intermediate beams spaced rearwardly from the rear end of the rod carried by the outer beam and with the rear end of the rod carried by the inner beam spaced rearwardly of the rear ends of the rods carried by the intermediate beams.

8. In a tractor, a plow-type windrow turner comprising an elongated frame mounted on the tractor and disposed transversely of the tractor and having one end projecting laterally from one side of the tractor, a plurality of spaced parallel beams attached to the outwardly projecting end of said frame and disposed longitudinally of the tractor, a curved bar carried by each beam and extending outwardly beyond the rear wheel of the tractor on the side of the tractor on which the turner is mounted for directing plants sidewardly of the tractor and clear of the rear wheel as the tractor is moved forwardly, and means securing the frame to the tractor including a pair of side members mounted on the sides of the tractor and horizontal pivots securing said side members to said frame to permit vertical swinging movement of said frame.

WALTER I. MILLER.

References Cited in the file of this patent

UNITED STATES PATENTS

| Number | Name | Date |
|---|---|---|
| 49,673 | Witmer | Aug. 29, 1865 |
| 2,254,672 | Arnold | Sept. 2, 1941 |
| 2,296,065 | Slamp | Sept. 15, 1942 |
| 2,315,522 | Hauge | Apr. 6, 1943 |
| 2,449,603 | Hammon | Sept. 21, 1948 |
| 2,601,305 | Laun | June 24, 1952 |